United States Patent
Chishima

(10) Patent No.: US 12,099,582 B2
(45) Date of Patent: Sep. 24, 2024

(54) ELECTRONIC DEVICE AND CONTROL METHOD

(71) Applicant: CANON KABUSHIKI KAISHA, Tokyo (JP)

(72) Inventor: Yuki Chishima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 17/535,399

(22) Filed: Nov. 24, 2021

(65) Prior Publication Data

US 2022/0171834 A1 Jun. 2, 2022

(30) Foreign Application Priority Data

Nov. 30, 2020 (JP) ................................. 2020-198678

(51) Int. Cl.
*G06F 21/31* (2013.01)
*H02J 7/00* (2006.01)

(52) U.S. Cl.
CPC .......... *G06F 21/31* (2013.01); *H02J 7/00045* (2020.01)

(58) Field of Classification Search
None
See application file for complete search history.

(56) References Cited

U.S. PATENT DOCUMENTS

| 10,044,198 | B2 * | 8/2018 | Okawa | H02J 7/00047 |
| 2006/0033836 | A1 | 2/2006 | Umeyama | |
| 2007/0123316 | A1 * | 5/2007 | Little | H01M 10/42 |
| | | | | 455/404.1 |
| 2015/0207185 | A1 * | 7/2015 | Kono | H02J 7/00714 |
| | | | | 429/61 |
| 2017/0064115 | A1 * | 3/2017 | Hara | G06F 3/1238 |

FOREIGN PATENT DOCUMENTS

| JP | 2006-054754 A | | 2/2006 |
| JP | 2017120950 A | * | 7/2017 |

* cited by examiner

*Primary Examiner* — James R Turchen
(74) *Attorney, Agent, or Firm* — Cowan, Liebowitz & Latman, P.C.

(57) ABSTRACT

An electronic device includes a communication unit and a control unit. The communication unit performs authentication communication to authenticate an external device connected to the electronic device. The control unit sets a time limit of the authentication communication to a predetermined time in a case where the external device is a first device. The predetermined time is a time that is longer than a time required for authentication communication between the first device and the electronic device, and is shorter than a time required for authentication communication between the electronic device and a second device different from the first device.

9 Claims, 8 Drawing Sheets

BATTERY GRIP

ELECTRONIC DEVICE AND CONTROL METHOD

BACKGROUND

Field of the Disclosure

Aspects of the disclosure generally relate to an electronic device and a method of controlling the electronic device.

Description of the Related Art

Japanese Patent Application Publication No. 2006-054754 discloses that when an external device (battery) connected to an electronic device is authenticated, the electronic device is operated in a normal mode if the external device is an official product, and the electronic device is operated in a minimum power mode if the external device is a non-official product.

As the external device, a non-official battery grip, to which an official battery is connected, may be connected to an electronic device.

Some non-official battery grips may be modified such that authentication communication between the electronic device and the non-official battery grip is performed using the authentication information of an official battery. In this case, the electronic device may incorrectly recognize the non-official battery grip as an official battery grip.

SUMMARY

According to various embodiments, there is provided an electronic device including a communication unit that performs authentication communication to authenticate an external device connected to the electronic device, and a control unit that sets a time limit of the authentication communication to a predetermined time in a case where the external device is a first device, wherein the predetermined time is a time that is longer than a time required for authentication communication between the first device and the electronic device, and is shorter than a time required for authentication communication between the electronic device and a second device different from the first device.

According to various embodiments, there is provided an electronic device including a communication unit that performs authentication communication to authenticate an external device connected to the electronic device, and a control unit that performs the authentication communication using a first communication method corresponding to first authentication information in a case where the external device is a first device, and performs the authentication communication using a second communication method corresponding to second authentication information and different from the first communication method, in a case where the external device is a second device different from the first device.

According to various embodiments, there is provided a method including performing authentication communication to authenticate an external device connected to an electronic device, and setting a time limit of the authentication communication to a predetermined time in a case where the external device is a first device, wherein the predetermined time is a time that is longer than a time required for authentication communication between the first device and the electronic device, and is shorter than a time required for authentication communication between the electronic device and a second device different from the first device.

According to various embodiments, there is provided a method including performing authentication communication to authenticate an external device connected to the electronic device, and performing the authentication communication using a first communication method corresponding to first authentication information in a case where the external device is a first device, and performing the authentication communication using a second communication method corresponding to second authentication information and different from the first communication method, in a case where the external device is a second device different from the first device.

Further aspects of the disclosure will become apparent from the following description of exemplary embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
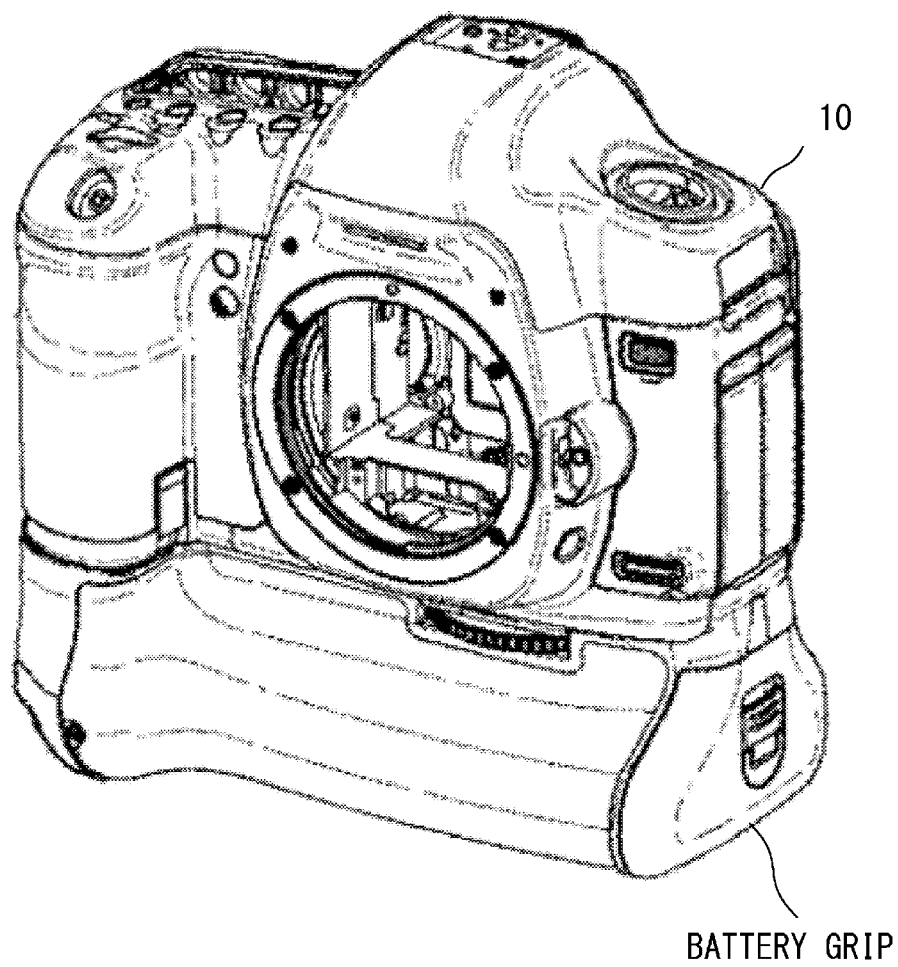
FIG. 1 is an external view of an electronic device to which an external device is connected.

FIG. 1 is an external view of an electronic device 10 to which a battery grip (external device: power supply accessory) is connected. A battery (external device: power supply accessory) is connected to the battery group. The battery can be directly connected to the electronic device 10, but may also be indirectly connected to the electronic device 10 via the battery grip, as illustrated in FIG. 1.

External devices include both official products and non-official products. If a non-official external device is connected to the electronic device 10, a residual capacity of the battery may not be correctly indicated. Therefore in the electronic device 10, supply of power is controlled in a case where a non-official external device is connected. For example, the electronic device 10 operates in the power saving mode if a non-official external device is connected.

In order to distinguish an official product from a non-official product, the electronic device 10 performs authentication communication (an authentication process) when an external device is connected. For example, the electronic device 10 performs the authentication communication using an authentication IC included in the external device. In the authentication communication, the external device is authenticated using such encryption methods as a common key encryption method or a public key encryption method, and the external device is successfully authenticated in the case where the authentication information of the electronic device 10 matches with the authentication information of the external device. Some non-official products may include non-official authentication ICs, which mimic the authentication ICs of official products, but normally it is difficult to include an authentication IC that is the same as the authentication IC of the official product. This means that a non-official authentication IC fails in the authentication communication, and the electronic device 10 can determine that the external device including a non-official authentication IC is a non-official product.

Figure 2:
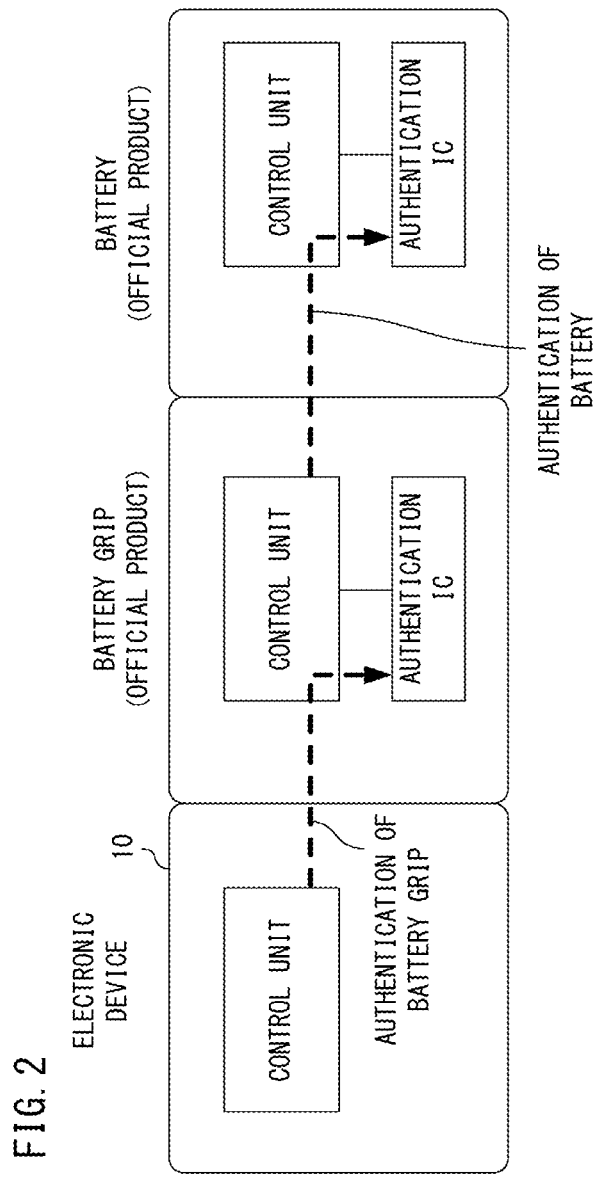
FIG. 2 is a block diagram illustrating a configuration example of a system including the electronic device 10.

FIG. 2 is a block diagram illustrating a configuration example of a system including the electronic device 10 according to the first embodiment. In FIG. 2, an official battery grip is connected to the electronic device 10. Furthermore, an official battery is connected to the battery grip.

The battery grip is authenticated by the electronic device 10. For example, in order to authenticate that the battery grip is an official product, a control unit of the electronic device 10 acquires the authentication information from the authentication IC of the battery grip via a control unit of the battery grip, whereby the electronic device 10 and the battery grip perform the authentication communication.

The battery is authenticated by the battery grip. For example, in order to authenticate that the battery is an official product, the control unit of the battery grip acquires the authentication information from the authentication IC of the battery via the control unit of the battery, whereby the battery grip and the battery perform authentication communication. Then the control unit of the battery grip notifies the electronic device 10 of the authentication result of the battery. Then, after the battery grip and the battery are successfully authenticated, the control unit of the electronic device 10 supplies power to each components of the electronic device 10.

Figure 3:
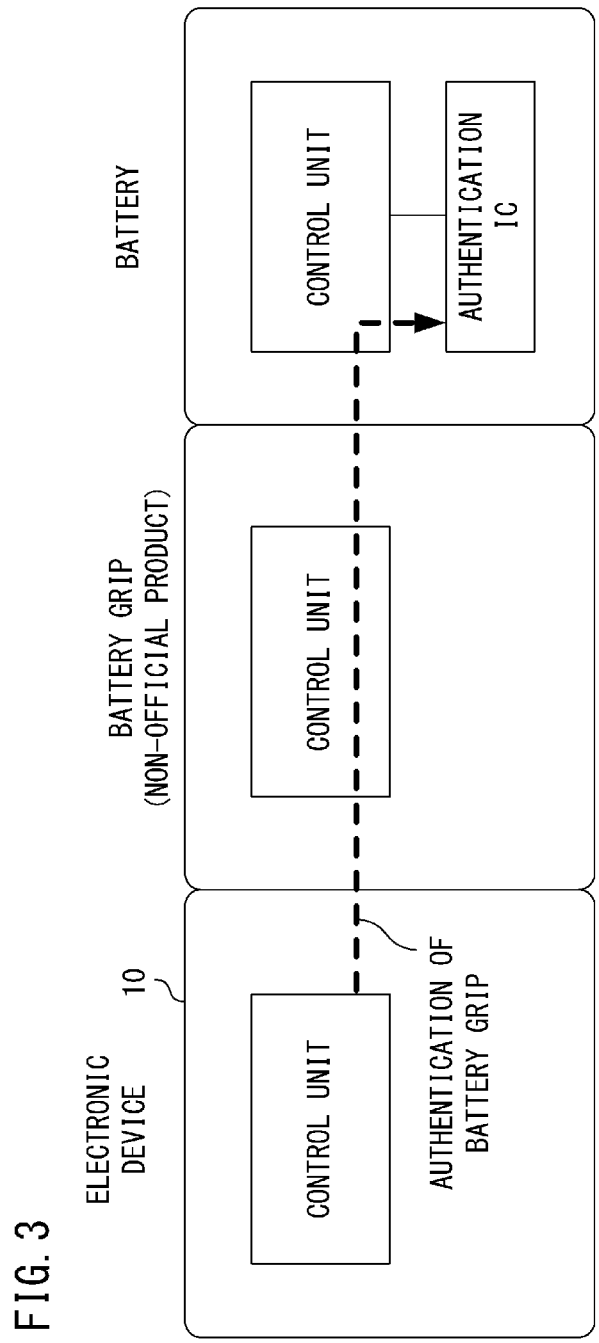
FIG. 3 is a block diagram for describing a disadvantage of the system illustrated in FIG. 2.

FIG. 3 is a block diagram for describing a disadvantage of a system illustrated in FIG. 2. A non-official battery grip does not include an official authentication IC. However some non-official battery grips may use an (official) authentication IC of the battery, instead of the authentication IC of the battery grip, for the authentication communication between the electronic device 10 and the battery grip, as illustrated in FIG. 3, by illegally modifying the internal communication path. In this case, the authentication communication is established between the electronic device 10 and the official authentication IC (authentication IC of the battery), hence the electronic device 10 incorrectly recognizes the non-official battery grip as the official product.

In order to solve this problem, the electronic device 100 according to the first embodiment sets a time limit in the authentication communication depending on the type of an external device that is connected to the electronic device 100.

Figure 4:
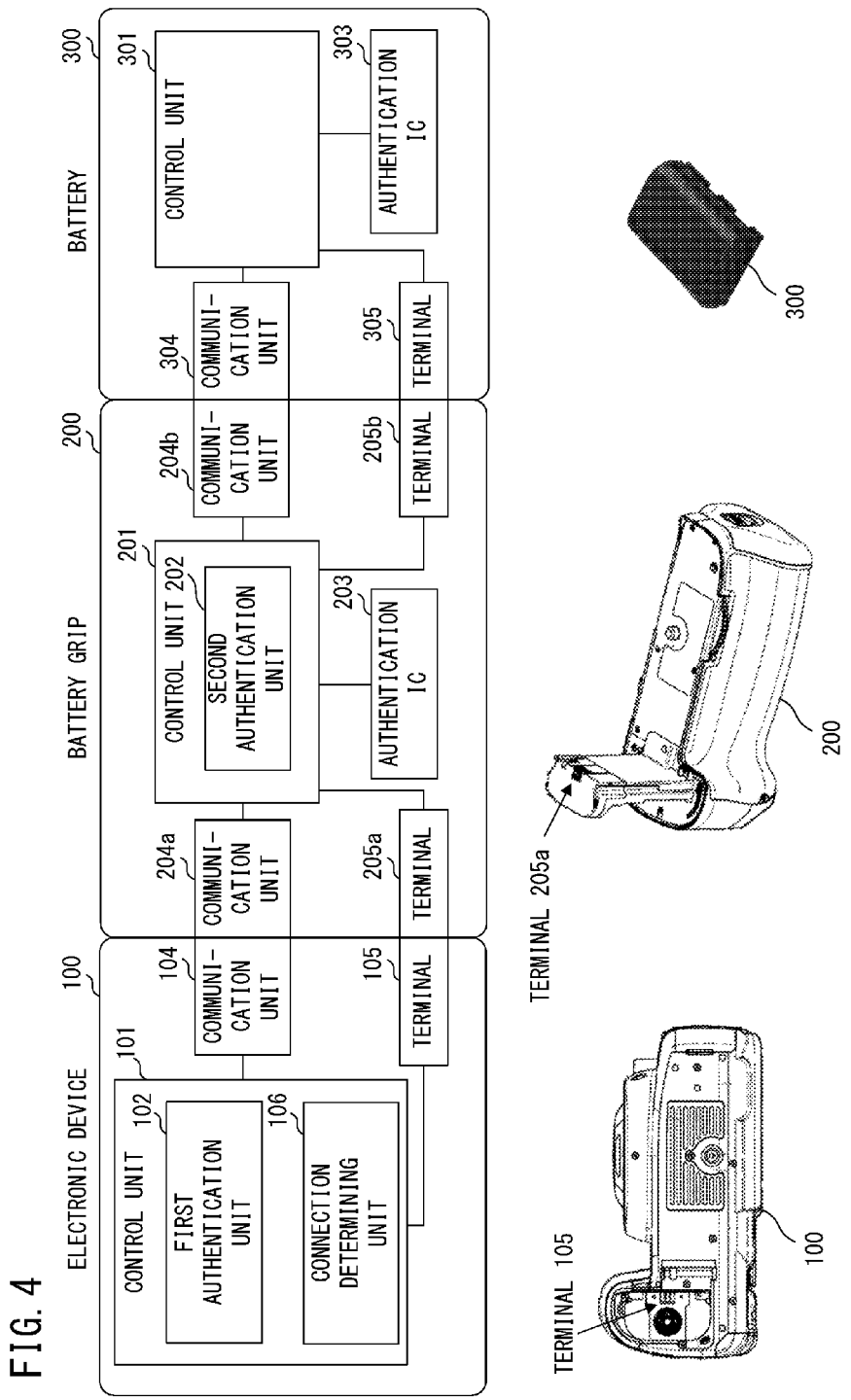
FIG. 4 is a block diagram illustrating a configuration of a system including an electronic device 100 according to a first embodiment.

FIG. 4 is a block diagram illustrating a configuration example of a system including the electronic device 100 according to the first embodiment. The system according to the first embodiment includes the electronic device 100, a battery grip 200 and a battery 300. The battery grip 200 is connected to the electronic device 100, and the battery 300 is connected to the battery grip 200.

The electronic device 100 includes a control unit 101, a first authentication unit 102, a communication unit 104, a terminal 105, and a connection determining unit 106. The control unit 101 is a CPU that controls each components of the electronic device 100 by executing a program stored in the memory. The first authentication unit 102 controls the communication unit 104, so as to perform the authentication communication between the electronic device 100 and an external device (the battery grip 200 or the battery 300 in the case of the first embodiment). The first authentication unit 102 can also control the communication speed of the authentication communication. The communication unit 104 communicates with the external device connected to the electronic device 100. The terminal 105 is a connector that electrically connects the electronic device 100 and the battery grip 200. The connection determining unit 106 determines the type of the external device connected to the electronic device 100. In the first embodiment, the connection determining unit 106 determines whether the external device connected to the electronic device 100 is the battery grip 200 (first device) or the battery 300 (second device).

The method of determining the type of the external device is not especially limited, but, for example, in a case where each external device has a circuit indicating a mutually different resistance value, the connection determining unit 106 determines the type of the external device in accordance with the resistance value. By the electronic device 100 executing the program stored in the memory, the functions of the first authentication unit 102 and the connection determining unit 106 of the electronic device 100 are provided. A part of or all of these functions may be performed by a dedicated logic circuit (e.g. ASIC, FPGA). The connection determining unit 106 may be physical buttons that are disposed on the electronic device 100.

The battery grip 200 includes a control unit 201, a second authentication unit 202, an authentication IC 203, communication units 204a and 204b, and terminals 205a and 205b. The control unit 201 is a CPU that controls each components of the battery grip 200 by executing a program stored in the memory. In the first embodiment, the control unit 201 is a CPU (high performance CPU) which has a performance similar to the control unit 101. The second authentication unit 202 controls the communication unit 204b, so as to perform the authentication communication between the battery grip 200 and the external device (the battery 300 in the case of the first embodiment). The authentication IC 203 is an IC chip that is used when the electronic device 100 performs the authentication communication with the battery grip 200, and has authentication information. The communication unit 204a communicates with the electronic device 100 connected to the battery grip 200. The terminal 205a is a connector that electrically connects the electronic device 100 and the battery grip 200. The communication unit 204b communicates with the battery 300 which is connected to the battery grip 200. The terminal 205b is a connector that electrically connects the battery grip 200 and the battery 300.

The battery 300 includes a control unit 301, an authentication IC 303, a communication unit 304, and a terminal 305. The control unit 301 is a CPU that controls each components of the battery 300 by executing a program stored in the memory. In the first embodiment, the control unit 301 is a CPU of which performance is inferior to the control unit 101 and the control unit 201. For example, the control unit 101 and the control unit 201 are CPUs of which processing speed is at least 10 time faster than the CPU of the control unit 301. This is because the control unit 301 included in the battery is normally demanded to be compact and inexpensive, and performance thereof becomes inferior to the control unit 101 and the control unit 201. The authentication IC 303 is an IC chip that is used when the battery grip 200 performs the authentication communication with the battery 300, and has authentication information. In the first embodiment, the authentication IC 303 (authentication information thereof) is similar to the authentication IC 203 (authentication information thereof) included in the battery grip 200. In a case where the battery 300 is directly connected to the electronic device 100 without the battery grip 200, the electronic device 100 performs the authentication communication with the battery 300 using the authentication IC 303. The communication unit 304 communicates with the battery grip 200 connected to the battery 300. The terminal 305 is a connector that electrically connects the battery grip 200 and the battery 300. The battery 300 includes at least one battery cell, and power is supplied from at least one battery cell to at least one of the electronic device 100 and the battery grip 200.

The authentication communication according to the first embodiment will now be described. In the first embodiment, the first authentication unit 102 performs the authentication communication considering the performance of the CPU of the external device (the battery grip 200 or the battery 300) connected to the electronic device 100. In the case of the battery grip 200 including the control unit 201 of which performance is similar to the control unit 101 (high performance), high-speed communication is possible, and in the case of the control unit 301 of which performance is inferior to the control units 101 and 201, the communication is slower than the communication with the battery grip 200. This means that the authentication time of the electronic device 100 is fast with the battery grip 200, and slow with the battery 300.

Therefore the time limit of the authentication communication between the electronic device 100 and the battery grip 200 is set to a predetermined time (predetermined threshold). Then when the authentication is performed between the electronic device 100 and the battery grip 200, the electronic device 100 determines that the authentication communication fails in the case where the authentication communication does not complete even if the predetermined time elapses at the start of the authentication communication. Thereby when the authentication communication is performed with the non-official battery grip 200, the electronic device 100 can determined that the battery grip 200 is a non-official product, even if the authentication communication is performed with the authentication IC 303 of the battery 300 by modifying the communication path. The "predetermined time" is time that is longer than the time required for the authentication communication between the electronic device 100 and the battery grip 200, and shorter than the time required for the authentication communication between the electronic device 100 and the battery 300.

The control unit 301 of the battery 300 may be a CPU of which performance is similar to the control unit 101 and the control unit 201. In this case, the electronic device 100 may use different communication methods between the case of performing the authentication communication with the battery grip 200 and the case of performing the authentication communication with the battery 300. For example, in the case of performing the authentication communication with the battery grip 200, the electronic device 100 uses a communication standard which allows high-speed communication. In the case of the authentication communication with the battery 300, the electronic device 100 uses a low-speed communication standard. Thereby just like the above mentioned case of using a difference of performance levels of CPUs, whether the battery grip 200 is an official product or not can be determined depending on whether the time required for the authentication communication exceeds a predetermined time or not. Furthermore, in the case where the control unit 301 of the battery 300 is a CPU of which performance is similar to the control unit 101 and the control unit 201 (high performance CPU), the processing speed of each CPU may be differentiated from each other. For example, the processing speeds of the control unit 101 and the control unit 201 are controlled to be fast, and the processing speed of the control unit 301 is controlled to be slow.

Figure 5:
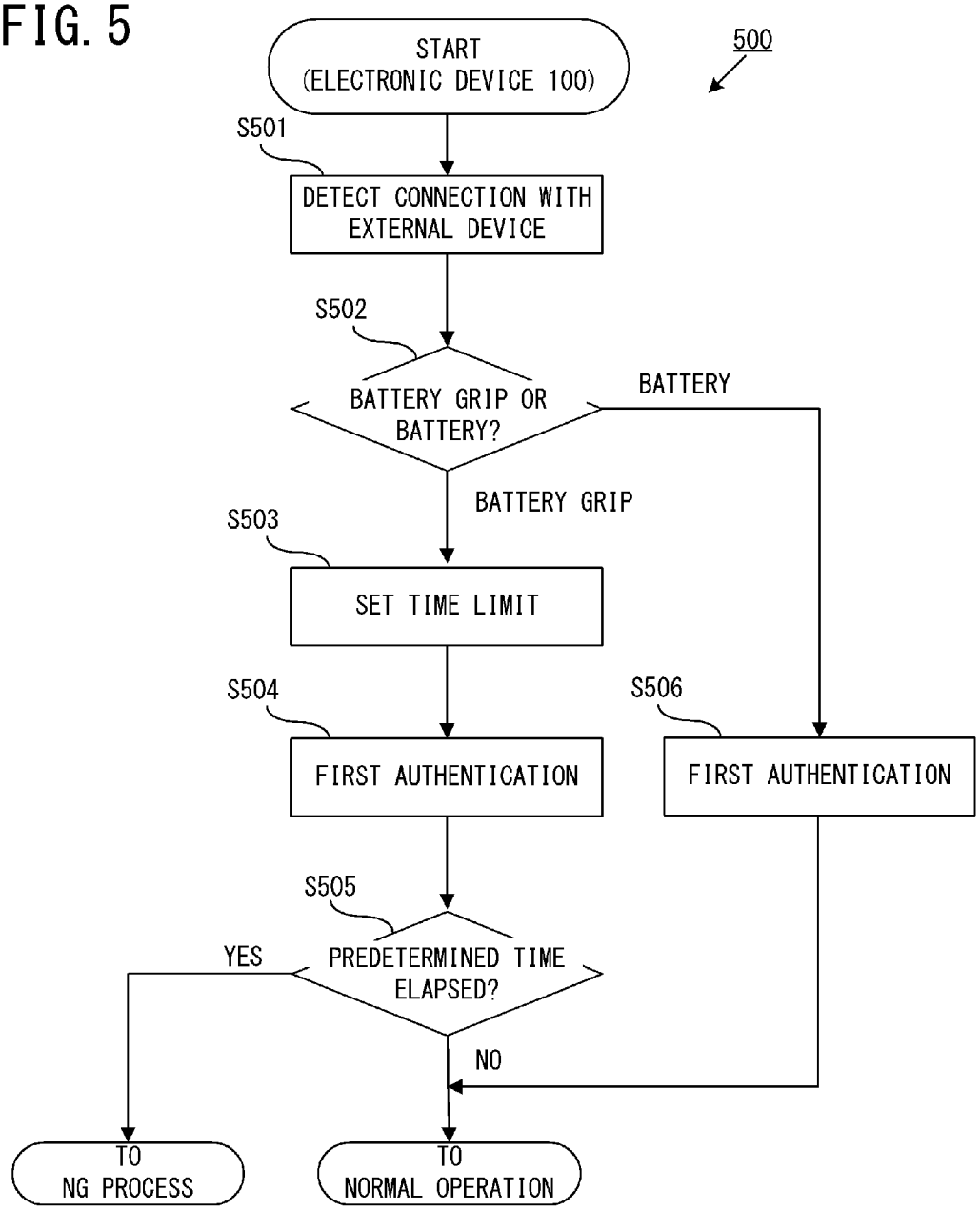
FIG. 5 is a flow chart illustrating an example of a process 500 according to the first embodiment.

FIG. 5 is a flow chart illustrating an example of a process according to the first embodiment. The process 500 as shown in this flow chart is controlled by the control unit 101 of the electronic device 100 executing the program. Here an example when the battery grip 200 or the battery 300 is connected to the electronic device 100 will be described.

In step S501, the control unit 101 detects that an external device is connected to the electronic device 100.

In step S502, the control unit 101 (connection determining unit 106) determines whether the external device connected to the electronic device 100 is the battery grip 200 or the battery 300. Processing 500 advances to step S503 if it is determined that the external device connected to the electronic device 100 is the battery grip 200, or to step S506 if it is determined that the external device connected to the electronic device 100 is the battery 300.

In step S503, the control unit 101 sets a time limit for the first authentication unit 102. For example, the control unit 101 sets a predetermined time to limit the time of the authentication communication. Furthermore, the control unit 101 controls such that the speed of the authentication communication in the authentication communication with the battery grip 200 (later mentioned in step S504) is faster (e.g. at least 10 times faster) than the authentication communication with the battery 300 (later mentioned in step S506).

In step S504, the control unit 101 (first authentication unit 102) performs first authentication. For example, the control unit 101 performs the authentication communication with the battery grip 200 connected to the electronic device 100.

In step S505, the control unit 101 determines whether the time of the authentication communication exceeds a predetermined time. The control unit 101 performs a normal operation if the predetermined time is not exceeded, and the control unit 101 performs an NG operation if the predetermined time is exceeded. The case where the time of the authentication communication exceeds the predetermined time is, for example, a time where the authentication communication does not complete, even if the predetermined time elapses at the start of the authentication communication. The normal operation may be such a general operation as receiving power supplied from the battery as usual, for example. The NG operation may be such a general operation as shutting down the power supplied from the battery, suppressing the power supplied from the battery, or partially limiting the operation of the electronic device 100, for example. For the NG process, the control unit 101 may display a notification on the display unit (not illustrated) that the battery grip 200 connected to the electronic device 100 is a non-official product.

Figure 6:
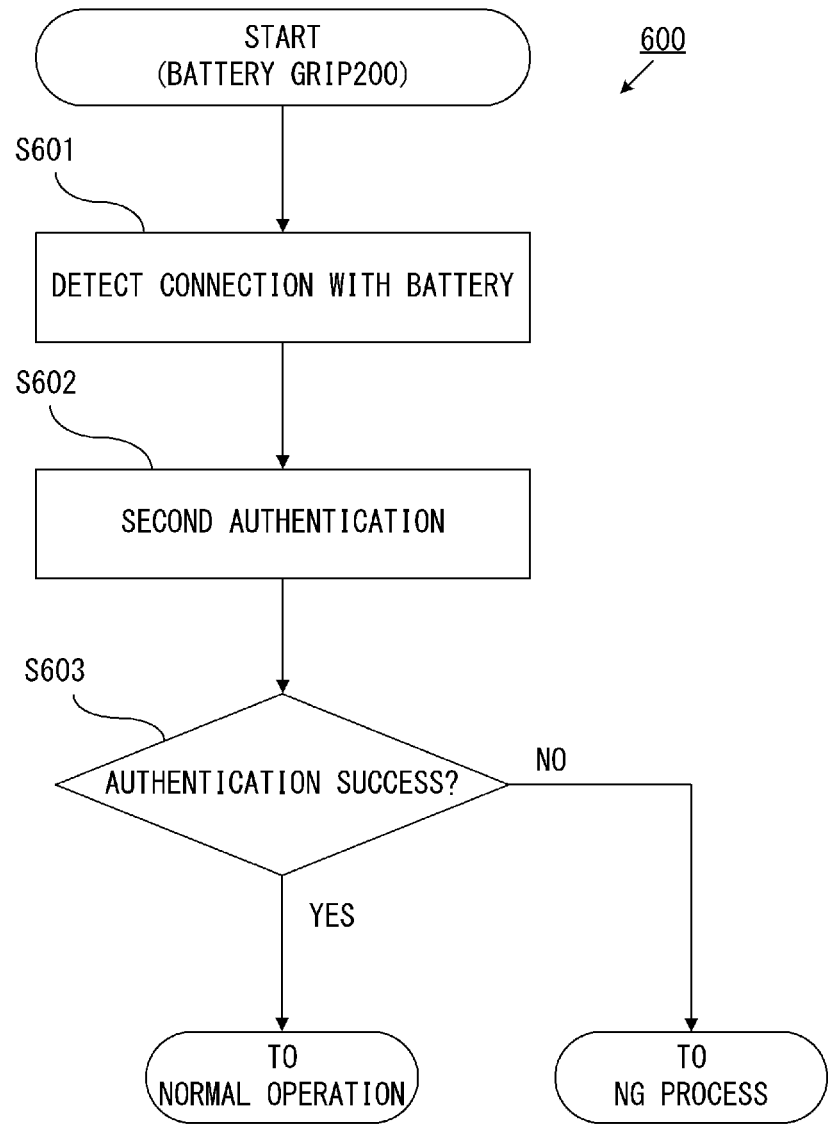
FIG. 6 is a flow chart illustrating an example of a process 600 according to the first embodiment.

FIG. 6 is a flow chart illustrating an example of a process according to the first embodiment. The process 600 as shown in this flow chart is controlled by the control unit 201 of the battery grip 200 executing a program. Here an example when the battery 300 is connected to the battery grip 200 will be described.

In step S601, the control unit 201 detects that the battery 300 is connected to the battery grip 200.

In step S602, the control unit 201 performs second authentication. For example, the control unit 201 performs the authentication communication with the battery 300 connected to the electronic device 100.

In step S603, the control unit 201 determines whether the second authentication succeeded. If the second authentication succeeded (YES in step S603), the control unit 201 performs a normal operation of the battery grip 200. The normal operation is not especially limited, and, for example, the battery grip 200 notifies the electronic device 100 that the authentication with the battery 300 succeeded. If the second authentication fails (NO in step S603), the control unit 201 performs an NG process. The NG process is not especially limited, and, for example, the battery grip 200 notifies the electronic device 100 that the authentication with the battery 300 fails. Unlike the first authentication, the time limit is not set for the second authentication, hence the authentication can be performed without any problem even if the communication speed of the control unit 301 is slow.

As described above, according to the first embodiment, when the authentication communication with the battery grip 200 is performed, the electronic device 100 determines that the authentication with the battery grip 200 fails if the authentication process does not complete, even if a predetermined time elapses at the start of the authentication communication. Thereby the authentication communication between the electronic device 100 and the battery grip 200 can be performed appropriately.

Second Embodiment

In the first embodiment, it is determined whether the external device is an official product or not, depending on whether the authentication communication between the electronic device 100 and the external device exceeds a predetermined time or not. In the second embodiment, an example of differentiating the communication method of the authentication communication, depending on the type of the external device, will be described. Components or processes the same as the first embodiment is denoted with a same reference sign, and description thereof is omitted.

Figure 7:
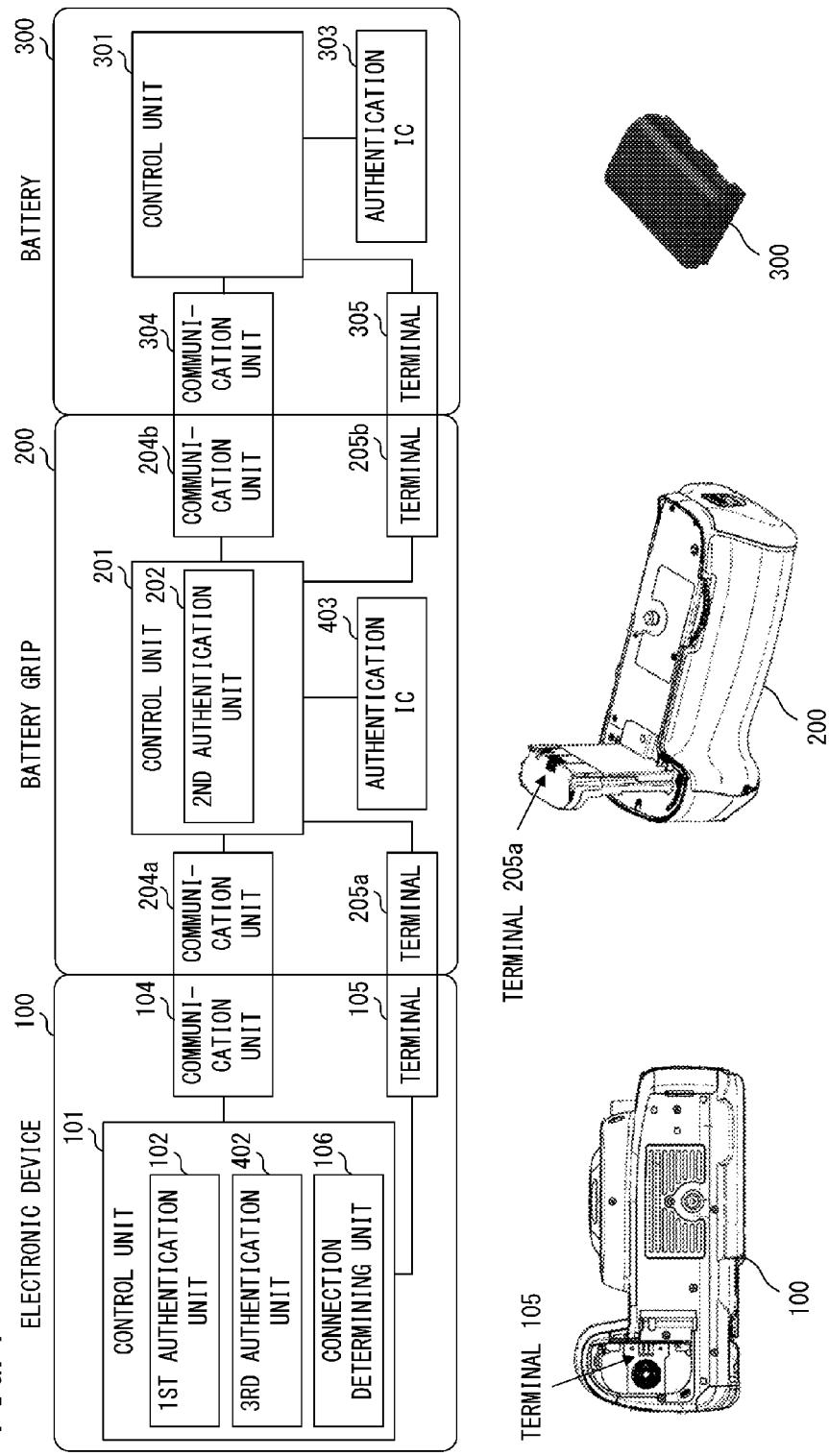
FIG. 7 is a block diagram illustrating a configuration example of a system including an electronic device 100 according to a second embodiment.

FIG. 7 is a block diagram illustrating a configuration example of a system including the electronic device 100 according to the second embodiment. The electronic device 100 of the second embodiment includes the components described in the first embodiment and a third authentication unit 402. The third authentication unit 402 controls the communication unit 104, so as to perform the authentication communication between the electronic device 100 and an external device using a communication method (first communication method) that is different from the first authentication unit 102. In the first embodiment, the control unit 101 and the control unit 201 have similar performances, but in the second embodiment, the performance of each control unit is not especially limited. The functions of the third authentication unit 402 are provided by the electronic device 100 executing the program stored in the memory. A part of or all of these functions may be performed by a dedicated logic circuit (e.g. ASIC, FPGA).

The battery grip 200 of the second embodiment includes an authentication IC 403, instead of the authentication IC 203 of the first embodiment. The authentication IC 403 includes the authentication information used for the authentication communication performed by the third authentication unit 402 (first authentication information). The authentication information of the authentication IC 403 is different from the authentication information of the authentication IC 203 and the authentication information of the authentication IC 303 of the first embodiment (second authentication information). Therefore, in the authentication communication between the electronic device 100 and an external drive, the third authentication unit 402 determines that the authentication of the external device fails if the external device does not include the authentication IC 403 (authentication information thereof). On the other hand, in the authentication communication between the electronic device 100 and an external device, the first authentication unit 102 determines that the authentication of the external device fails if the external device does not include the authentication IC 303 (authentication information thereof). Thereby even if the authentication communication with the electronic device 100 is performed using the authentication IC of the battery by modifying the communication path inside a non-official battery grip, the authentication fails since the authentication IC is different from the authentication IC of the battery grip (authentication information thereof).

Figure 8:
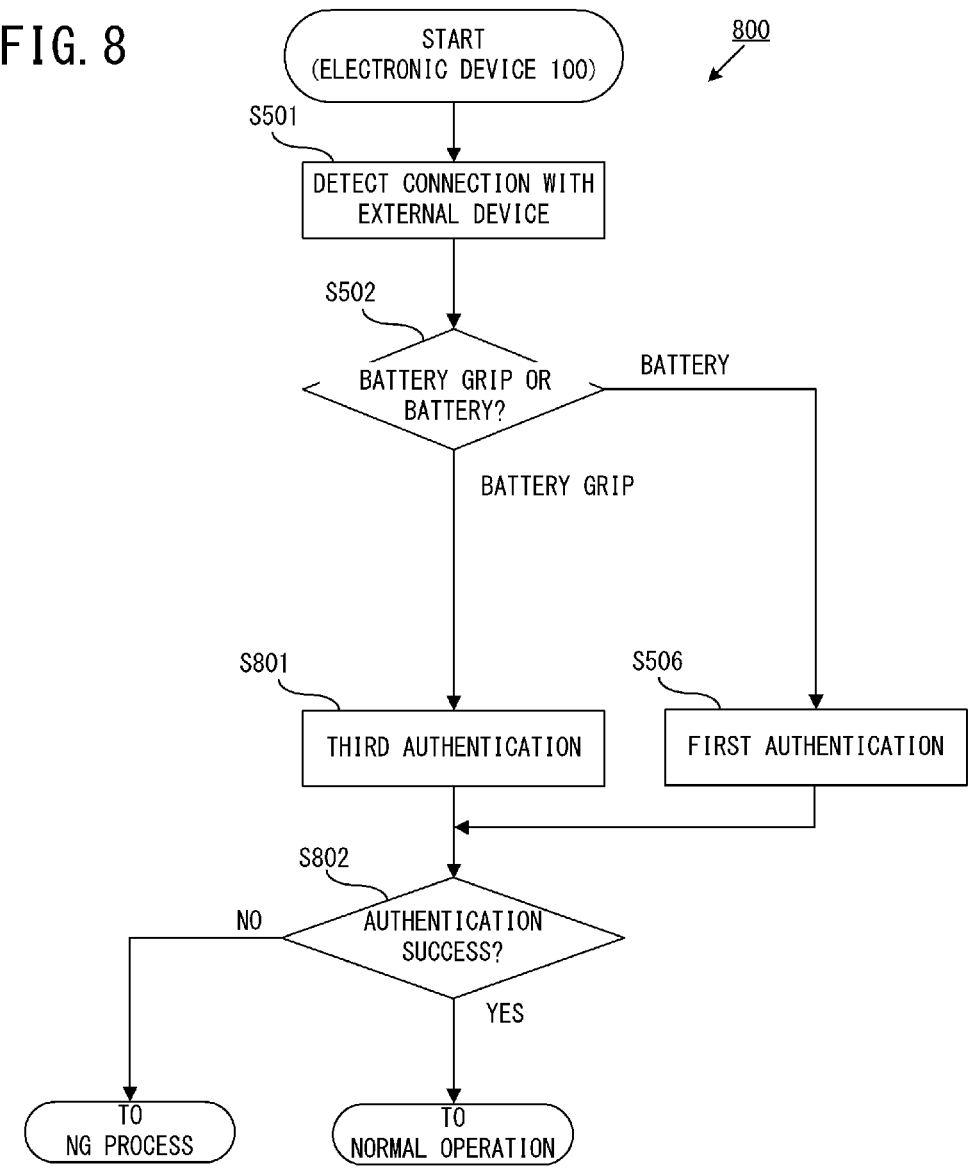
FIG. 8 is a flow chart illustrating an example of a process 800 according to the second embodiment.

FIG. 8 is a flow chart illustrating an example of a process according to the second embodiment. The process 800 as shown in this flow chart is controlled by the control unit 101 of the electronic device 100 executing the program. Here an example when the battery grip 200 or the battery 300 is connected to the electronic device 100 will be described. The processes in steps S501 and S502 are the same as the first embodiment, hence description thereof is omitted. However, process 800 advances to S801 if it is determined in step S502 that the external device connected to the electronic device 100 is the battery grip 200.

In step S801, the control unit 101 (third authentication unit 402) performs the third authentication if the battery grip 200 is connected to the electronic device 100. For example, the control unit 101 performs the authentication communication with the battery grip 200 which is connected to the electronic device 100. Here, in order to succeed in the third authentication, the authentication information of the authentication IC 403 of the external device must be acquired. This means that the third authentication fails if the battery grip is a non-official product (if the battery grip does not include the official authentication IC 403).

In the case where the battery 300 is connected to the electronic device 100, the control unit 101 (first authentication unit 102) performs the first authentication (second communication method) in step S506. For example, the control unit 101 performs the authentication communication with the battery 300 which is connected to the electronic device 100. The process in step S506 is the same as the first embodiment. Here, in order to succeed in the first authentication, the authentication information of the authentication IC 303 of the external device must be acquired.

In step S802, the control unit 101 determines whether the first authentication or the third authentication succeeded. If the first authentication or the third authentication succeeded (YES in step S802), the control unit 101 performs a normal operation. If the first authentication or the third authentication fails (NO in step S802), the control unit 101 performs an NG process. The normal operation and the NG process are the same as the first embodiment, hence description thereof is omitted.

According to the second embodiment, the communication method of the authentication communication is changed, depending on the type of the external device connected to the electronic device 100, whereby it can be easily determined whether the external device is an official product or not.

Third Embodiment

The various functions, processes or methods described in the above embodiments may be implemented by a personal computer, a microcomputer, a central processing unit (CPU), or a microprocessor executing a program. In the third embodiment, the personal computer, the microprocessor, the central processing unit (CPU) or the microprocessor is referred to as "computer X". Furthermore, in the third embodiment, the program that controls the computer X and implements the various functions, processes, or methods described in the above embodiments is referred to as "program Y".

The various functions, the processes, or methods described in the above embodiments are implemented by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory, or a non-volatile memory. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-198678, filed Nov. 30, 2020, which is hereby incorporated by reference herein in its entirety.

What is claimed is:

1. An electronic device comprising:
    a CPU that executes a program stored in a memory and causes the electronic device to function as:
    a communication unit that performs authentication communication to authenticate an external device connected to the electronic device; and
    a control unit that sets a time limit of the authentication communication to a predetermined time in a case where the external device is a first device,
    wherein the predetermined time is a time that is longer than a time required for authentication communication between the first device and the electronic device, and is shorter than a time required for authentication communication between the electronic device and a second device different from the first device.

2. The electronic device according to claim 1, wherein the control unit controls a speed of the authentication communication to a speed faster than a case where the external device is the second device, in a case where the external device is the first device.

3. The electronic device according to claim 2, wherein the control unit controls a speed of the authentication communication to a speed that is at least 10 times faster than the case where the external device is the second device, in a case where the external device is the first device.

4. The electronic device according to claim 1, wherein the control unit determines that the authentication communication fails, in a case where the external device is the first device and the authentication communication does not complete even if the predetermined time elapses from the start of the authentication communication.

5. The electronic device according to claim 4, wherein the control unit displays a notification on a display unit that the authentication communication fails, in a case where it is determined that the authentication communication fails.

6. The electronic device according to claim 1, wherein the first device is a battery grip, and
    wherein the communication unit performs the authentication communication with an authentication integrated circuit (IC) of the battery grip in a case where the external device connected to the electronic device is the battery grip having the authentication IC.

7. The electronic device according to claim 6, wherein the second device is a battery, and
    wherein the communication unit performs the authentication communication with an authentication IC of the battery in a case where the external device connected to the electronic device is the battery.

8. A method comprising:
    performing authentication communication to authenticate an external device connected to an electronic device; and
    setting a time limit of the authentication communication to a predetermined time in a case where the external device is a first device,
    wherein the predetermined time is a time that is longer than a time required for authentication communication between the first device and the electronic device, and is shorter than a time required for authentication communication between the electronic device and a second device different from the first device.

9. A non-transitory storage medium that stores a program causing a computer to execute a method, the method comprising:
    performing authentication communication to authenticate an external device connected to an electronic device; and
    setting a time limit of the authentication communication to a predetermined time in a case where the external device is a first device,
    wherein the predetermined time is a time that is longer than a time required for authentication communication between the electronic device and the first device, and is shorter than a time required for authentication communication between the electronic device and a second device different from the first device.

\* \* \* \* \*